Aug. 30, 1949.                    D. B. ROSSHEIM ET AL                    2,480,774
                  METHOD OF BENDING THIN WALLED THERMOPLASTIC
                              BODIES INCLUDING TUBES
                              Filed June 28, 1946
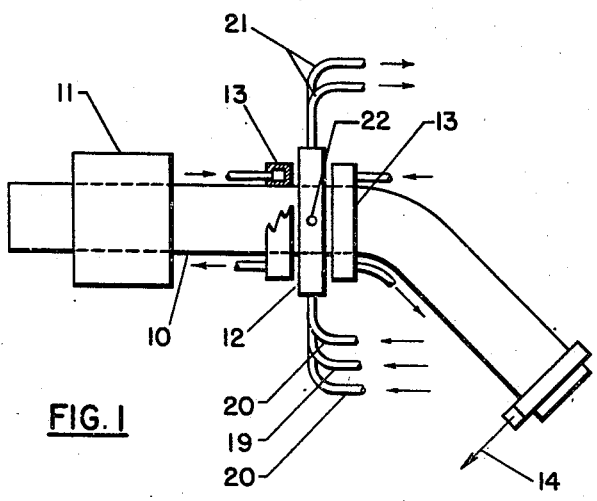
FIG. 1
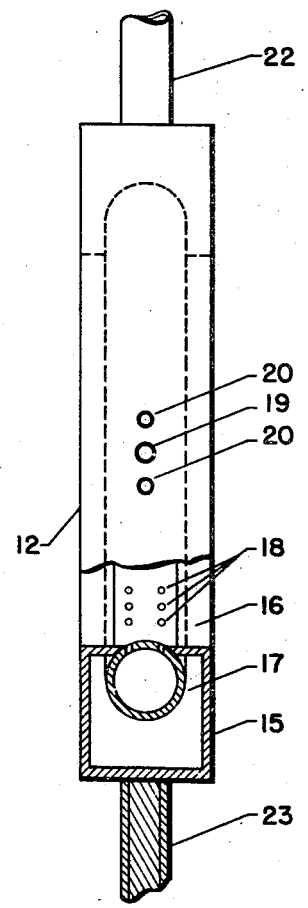
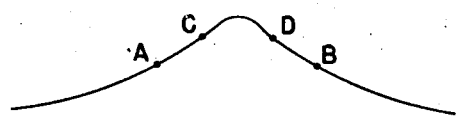
FIG. 2
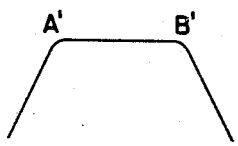
FIG. 3
FIG. 4
INVENTORS
DAVID B. ROSSHEIM
FREDERICK A. FICHTMUELLER
JAN MARTIN SCHENK
BY Virgil F. Davies
ATTORNEY Patented Aug. 30, 1949

2,480,774

UNITED STATES PATENT OFFICE 2,480,774

METHOD OF BENDING THIN WALLED THERMOPLASTIC BODIES, INCLUDING TUBES

David B. Rossheim, Teaneck, N. J., Frederick A. Fichtmueller, Staten Island, N. Y., and Jan Martin Schenk, Glen Ridge, N. J., assignors to The M. W. Kellogg Company, Jersey City, N. J., a corporation of Delaware Application June 28, 1946, Serial No. 679,900

15 Claims. (Cl. 153—40)

This invention relates to the shaping of thermoplastic bodies by hot-working operations.

When thermoplastic bodies are shaped by hot-working, in accordance with the practices now generally employed, it is seldom possible to prevent undesired distortion due to inelastic instability and/or uneven plastic flow unless dies, mandrels, and the like, are employed to control the shaping of the heated material. These dies, mandrels, and the like, render the operations expensive as they generally represent a major portion of the cost; the use of dies, mandrels, and the like, furthermore, complicates the operation and introduces many troublesome factors.

We have found a simple and efficient way of shaping thermoplastic bodies by hot-working which eliminates the use of expensive dies, mandrels, and the like shape controlling elements, and produces results generally at least the equal of the results obtained by the use of shape controlling elements.

It is a main object of this invention to provide a method of shaping thermoplastic bodies by hot-working in which uniform plastic deformation of the heated material is obtained.

It is also an important object of the invention to provide a method for shaping a thermoplastic body by hot-working in which unit areas of the body are heated to the chosen working temperatures sequentially, while the remainder of the body is maintained in condition to resist deformation, and said remainder employed to control the shaping of each of said unit areas, the dimensions of said unit areas being so chosen that the dimension in the direction, or directions, along which uneven plastic flow and/or inelastic instability tends to occur does not substantially exceed a critical value.

It is also a further prime object of the invention to provide a method for shaping a thermoplastic body by hot-working in which unit areas of the body are rapidly heated sequentially to chosen deformation temperatures, the temperature along any line in the unit areas in the direction, or directions, along which buckling and/or non-uniform plastic flow tends to occur being substantially constant, while the remainder of the body is maintained in condition to resist deformation, and, as each of said unit areas attains the chosen heated condition shaping pressure is applied to shape the unit area in controlled amounts. The application of the shaping pressure may be discontinuous and each of the unit areas shaped as a separate step in the operation; alternatively, the rate of heat input, the rate of movement of the body relative to the heating means, and the rate of load application can be so correlated and controlled that the operation is continuous or substantially so.

It is also an object of the invention to provide a method of heating a unit area of the body to be shaped to a desired plasticity, the unit area being so heated that substantially the full dimension thereof in any direction along which undesired deformation tends to take place is brought to a substantially uniform temperature while the temperature gradients at the ends of said dimension are steep enough to assure that the material contiguous to the heated unit area will resist deformation during the shaping of the heated unit area.

The further features, objects and advantages of the invention will be apparent from a consideration of the following description of a present preferred mode of carrying it out in practice, taken with the accompanying drawings, in which:

Fig. 1 is a diagrammatic plan view illustrating a shaping operation in accordance with the novel method.

Fig. 2 is a temperature gradient obtained by conventional localized heat input.

Fig. 3 is a temperature gradient of the character preferred in carrying out the invention, and Fig. 4 is a schematic, part sectional view, showing a form of a burner suitable for producing the gradient of Fig. 3.

The invention is of general application and may be used to advantage in any type of hot-working operation, such as bending, shaping, upsetting, drawing and the like; furthermore, the invention is not limited to thermoplastic bodies of any particular kind or shape and may be applied in connection with solid bodies, hollow bodies, closed-shaped bodies, open-shape bodies, etc. By the term "thermoplastic" we intend to include those materials that undergo a lowering of yield strength with increase in temperature, i. e., metals, thermoplastics and the like.

In shaping thermoplastic bodies by hot-working operations, the undesired deformations, or distortions, usually encountered are buckling, localized upsetting, and localized thinning out. The last is encountered in operations involving tension while the others are compression phenomena.

The first requirement for the successful practice of the invention is the determination of the dimensions of the area of the body to be heated and shaped during each step or increment of the shaping operation. This area can conveniently be referred to as the "unit area." We have established that the dimension of the unit area in the direction, or directions, in which uneven plastic flow and/or inelastic instability tends to occur is critical if commercially satisfactory products are to be obtained. "Commercially satisfactory products" is intended to cover that range of products having at one end products shaped by uniform plastic flow of the materials thereof which evidence no undesired deformation, and at the other end products which, while they evidence some undesired deformation due to buckling and/or localized uneven plastic flow, the undesired deformation is not sufficient to render the products unsatisfactory for use. While in a theoretical sense, there may be a sharp separation between shaping conditions that produce uneven plastic flow and/or inelastic instability and shaping conditions that completely eliminate uneven plastic flow and/or inelastic instability, in a practical sense, the separation is not sharp but rather there is an intermediate zone in which, while there is some evidence of undesired deformation, this is so minor that in some cases it is difficult to detect and in other cases it does not appreciably affect the quality of the product.

Theoretical considerations lead us to the conclusion that buckling due to inelastic instability should be completely eliminated, without the critical stress being a factor, if the critical length of the unit area is kept to a value less than the natural buckling wave length of the body at working temperature. Our practical results generally sustain this conclusion but indicate that it must be qualified to take into account departures from ideal conditions in each case. The above conclusion based on practical results may be stated as follows: Buckling is completely or substantially eliminated when the critical lengths, range from one-half to one-quarter, and less, the natural buckling wave length of the body at working temperature; with critical lengths ranging from three-quarters to one-half the natural buckling wave length at working temperature buckling comes into evidence, but the buckling is not so pronounced as to render the shaped bodies commercially unsatisfactory; and with critical lengths beyond three-quarters of the natural buckling wave length at working temperature. buckling becomes more pronounced so that whether or not the shaped bodies are commercially acceptable will depend on the particular requirements.

The undesired distortions due to non-uniform plastic flow, that is, localized upsetting, localized thinning out, and the like, are the result of many factors such as non-uniformity of the cross-section of the area and the length of the area subjected to the shaping forces, non-homogeneity of the material, anisotropy of the material, percentage deformation, etc. As these factors and their effects vary in each particular case, it is seldom fruitful to analyze them individually since a complete integration of analyses is not possible. In operations involving pure tension, localized thinning out can be completely eliminated if the length of the unit area is made equal to or greater than its thickness. In operations involving pure compression localized upsetting can be completely eliminated if the length of the unit area be made equal to or less than its thickness. Since in practice combined forces and multi-axial stress are the rule and pure tension or pure compression are in the nature of exceptions, the relationship just stated can only serve as guides in the determination of the best length of the unit area for each particular case.

It is apparent from the above that except in the simple cases involving buckling and localized upsetting, or involving only localized thinning out, the stresses imposed in the hot-working operations contemplated by this invention are so complex and vary so from one case to another that it is not possible to completely integrate them and their effects and from data thus obtained establish formulae of general application for the calculation of the required critical length of the unit area for substantial or complete elimination of undesired distortion. Consideration of results obtained in actual practice reveals that regardless of the complexity of the stresses imposed a relation exists between the length of the unit area, the thickness of the unit area, the percentage deformation and the amount of undesired distortion obtained. Also, unwanted distortion increases with an increase in percentage deformation, the increase in unwanted distortion apparently varies as some complex function of the percentage deformation. We have established that unwanted distortion can be completely, or substantially eliminated in every case if a proper ratio of critical length of the unit area to thickness of the unit area is chosen. For deformations in the order of 10% said ratio should approximate 4, for deformations in the order of 20% said ratio should approximate 3, for deformations in the order of 25% said ratio should approximate 2 and for deformations in the order of 30% said ratio should approximate 1. A ratio of 1 can usually be taken as a practical lower limit for with ratios materially less than 1 the critical lengths required are generally so short as to be impractical. Thus when the percentage deformation materially exceeds 30% a certain amount of unwanted distortion must be accepted. Certain amounts of unwanted distortion must also be accepted in those cases wherein even though the ratio approximates, or exceeds 1, the finite dimensions of the body to be shaped and the apparatus employed in shaping make it impossible to reduce the critical length to the value required by the proper ratio. We will show hereinafter how the effects of this residual unwanted distortion can be reduced to insignificant amounts if not completely eliminated.

The term percentage of deformation as used in the specification and claims means a bending or shaping in which the width of the unit band being bent is elongated or shortened on one side of the bend by the percentage given. Where the neutral axis of the bend is not mid-way between the sides of the body being bent the greatest deformation, either elongation or shortening, is used to indicate percentage of deformation.

While it is true in general that the shorter the critical length the better the results obtained from a purely shaping standpoint, excessively short critical lengths tend to complicate the operation and sometimes render it impractical. Thus, such short critical lengths may be chosen that the resulting unit areas are of such small dimensions that they are difficult, if not impossible, to obtain; also, as is evident, the smaller the unit areas the larger the number of shaping steps necessary and the smaller the stepwise movement of the body relative to the heating means. When the above considerations are balanced, it is found that the best overall results are obtained when the unit area is made of the maximum dimensions, within the limits set forth above, so that a maximum portion of the body is satisfactorily shaped during each step or increment of the operation.

The next requirement for successful practice of the invention is to heat the unit area to the chosen shaping temperature while the remainder of the body is maintained in condition to resist deformation so that the said remainder of the body will function as a shape controlling means and aids in maintaining the contour of the unit area.

If a conventional heating means is employed and directed at the center, or the middle, of the unit area, a temperature gradient approximating that shown in Fig. 2 is obtained, the critical length of the unit area being represented between points A and B. It is to be noted that in the region of points A and B the gradient is of gradual slope so that there cannot be any sharp difference in the plasticity of the material in the region of points A and B. The material adjacent points A and B is not in the best condition to resist deformation and cannot properly control the shaping of the material of the unit area A—B. Furthermore, in the middle of the gradient a considerable peak occurs between points C and D. The material in this peak is at temperatures considerably above the chosen deformation temperature so that it is much more plastic than the rest of the unit area. Upon shaping of unit area A—B the material between points C and D will tend to excessively distort. A gradient such as that shown in Fig. 2 may, in some instances, be satisfactory if the critical length of the unit area can be reduced to such length as to be defined by points C and D. In such cases, however, the critical length of the unit area will generally be excessively small, and the number of bending steps required will usually be excessive.

We have found that in order to obtain uniform plastic flow, the temperature gradient along the critical length should have a substantially zero slope and the gradients in the material immediately adjacent the heated unit area should be steep. These conditions are attained by a heating operation which produces a temperature gradient of the character shown in Fig. 3. In this gradient points A' and B' represent the chosen shaping temperature while the horizontal distance between them represents the critical length of the unit area. The gradient between points A' and B' is substantially horizontal and is devoid of high temperature peaks. Also, the gradient sharply slopes away from points A' and B' so that there is a sharp change in the condition of the material on each side of points A' and B'.

To obtain a temperature gradient of the character shown in Fig. 3 it is preferable to employ a heat source that is capable of quickly heating the unit area to the required temperature as with such a heat source the slope of the gradient below points A' and B' will be steep. To increase the slope of the gradient below points A' and B', it is found convenient to flank the unit area with a cooling means. Any preferred form of cooling means may be employed. A temperature gradient having substantially zero slope between points A' and B' can be obtained by employing a heating means that circumscribes the unit area being heated, i. e., the heating means supplies heat at the highest rate to the portion of the unit area adjacent the whole perimeter thereof and supplies heat at a lesser rate to the portion of the unit area within the perimetrical portion. If the whole unit area is heated in this manner for a proper time interval there will be no pronounced peaks between points A' and B' and the slope of the gradient between points A' and B' will be substantially zero.

The magnitude of the shaping force and the manner of its application may be determined in any preferred conventional way.

We have found that the spacing of the shaping steps, i. e., the distance through which the body and the heating means are moved relative to each other after each application of the shaping force, in the case of stepwise shaping, and the rate of progression of the body relative to the heating means, in the case of continuous shaping, is of importance and that by a proper choice of the spacing between the shaping steps the quality of the shaped product can be materially improved. In every case, the spacing between shaping steps should be less than the length of the unit area in order to avoid including in the shaped portion of the body narrow zones of improperly heated and shaped material which give the shaped portion of the body an uneven appearance. In other words, the successive unit areas must be overlapped sufficiently to assure that all of the material of the shaped portion of the body has been properly heated and shaped. The amount of overlap can easily be determined from observation in each case.

By properly choosing the spacing between the shaping steps the effects of the residual unwanted deformation, which, as heretofore stated, must at times be accepted because of limitations in the length of the unit area, can be completely eliminated or at least reduced to insignificant amounts. Since such residual unwanted deformations are repeated in each unit area and occur at substantially the same relative position in each unit area, we have found that if the unit areas are overlapped to such an extent that the unwanted deformations of one unit area unite to the unwanted deformations of the contiguous unit areas the effect of the unwanted distortions disappears. In operations involving deformations of the shaped bodies in the order of 10%, little, if any, overlap is required for this purpose as there is seldom any residual unwanted deformations in this order of percentage deformation so that for general purposes the spacing between steps, hereinafter referred to as I, can be made equal to the width of the unit area, hereinafter referred to as W. In operations wherein deformations in the order of 12½% are contemplated, the overlap resulting from an I/W ratio of about .75 is generally sufficient to eliminate the effects of the residual, unwanted deformations; when the deformations are in the order of 16⅔%, the overlap resulting from an I/W ratio of about .50 is sufficient; when the deformations are in the order of 25%, an I/W ratio of .25 will usually be found necessary. For deformations in excess of 25% it is seldom advisable to increase the I/W ratio beyond .25; as by so doing, the amount of the body actually shaped in each step becomes so small that the operation tends to become excessively expensive and impractical.

The values of the I/W ratio above set forth are the approximate limiting value, if values greater than those indicated are employed satisfactory results cannot be expected, however, if smaller values are employed satisfactory results will be obtained.

The invention will now be described in connection with the bending of a pipe length 10. A pipe bending operation has been chosen as such an operation involves deformation both in compression and in tension, and the body worked is subjected to complex stresses.

In carrying out the pipe bending operation, the apparatus illustrated in Figure 1 may conveniently be employed. The apparatus includes a support 11, preferably constructed and arranged to permit pipe 10 to be moved relative thereto in increments or steps of chosen length while it maintains the pipe axis fixed, (since supports of this type are common in the art, support 11 will not be described in detail here) a heating means 12, which may desirably be flanked by cooling rings 13, and a force-applying means 14 which may be any preferred arrangement, as for instance, a block and fall. Preferably heating means 12 and rings 13 are fixed in position and pipe 10 moved in steps relative thereto as the operation progresses. Alternatively, support 11 may be so constructed and arranged that it maintains pipe 10 fixed in position against longitudinal as well as lateral movement in which case heating means 12 and cooling rings 13 are supported to be moveable relative to pipe 10 in the incremental movements required.

The attainment of the novel results of the invention, especially when bending metal pipe length 10, is facilitated by the use of a heating means 12 that is capable of delivering large quantities of heat at high temperature levels. With such a heating means the heat gradient at each side of the unit band will in many cases be sufficiently steep to render the use of cooling rings 13 unnecessary. Also, with such a heating means the unit band may be brought to the desired bending temperature quickly thus materially reducing the operation time.

Oxygen-acetylene, or other hydrocarbon, burners, high frequency induction heaters and resistance heaters are capable of functioning satisfactorily in this service. In the bending of pipe length 10, generally of steel or other ferrous alloy, we at present prefer to employ an oxygen-acetylene burner because of its adaptability and the availability of the fuel.

In order to produce a heat gradient that approximates that of Fig. 3 as closely as possible, we prefer, as stated heretofore, to employ a heating means that circumscribes the unit band being heated, i. e., a heating means that supplies heat to the whole perimeter of the unit band at the highest rate and to the internal portions of the unit area at lesser rates so that the slope of the heat gradient between points A' and B' (Fig. 3) is substantially zero and there is no substantial high temperature peaks between points A' and B'. The same effect may also be obtained by the use of a conventional burner which in use is oscillated along the length of the unit band. By properly oscillating the burner a substantially horizontal gradient between points A' and B' may be obtained.

In bending pipe length 10 we at present prefer to employ oxygen-acetylene burner 12 of Figs. 1 and 4.

Burner 12 includes a hollow annular casing 15 through the central hole of which pipe 10 is adapted to pass. The component parts of casing 15 are united, as by welding to provide a water tight jacket around tubular burner ring 17. The inner wall 16 of casing 15 is interrupted to expose the inner portion of burner ring 17. In the exposed portion of burner ring 17 open two spaced rows of orifices 18 through which the combustible mixture passes. The rows of orifices 18 are spaced apart as required to supply heat at a maximum intensity to the peripheral region of the band of pipe 10 of chosen width. Since the combustible mixture of oxygen and acetylene is supplied to burner ring 17 through pipe 19 under pressure its distribution through orifices 18 is sufficiently uniform for practical purposes. It is sometimes preferable to supply the oxygen and the acetylene to burner ring 17 through separate pipes, not shown. When a better or a different distribution is desired burner ring 17 may be appropriately shaped or baffles may be employed as is common in the art. A burner ring 17 with fixed spacing between the rows of orifices 18 can only be used for a limited range of band widths, or critical lengths, even when cooling rings 13 are employed; for a wider range burner ring 17 may be substituted by any preferred arrangement that permits of adjustment of the spacing between the rows of orifices 18. Water or other cooling medium enters the hollow of casing 15 through tubes 20 and exits through tubes 21; a vent tube 22 is provided in the top of casing 15 to permit venting of any gas, or vapor that may accumulate in the top of casing 15. The heating means 12 is supported in position, or may be moved from one position to another through member 23 which is united to casing 15.

Cooling rings 13, when used, may be of any preferred construction and, for instance, may be hollow and provided with means for introducing a cooling means into them and means for exhausting the cooling means out of them. In place of hollow cooling rings 13 solid metal rings, water sprays, or other similar means may be employed.

In order to successfully carry out the pipe bending operation in accordance with this invention, it is necessary to determine the width of the unit band, hereinafter referred to as W, and the distance through which pipe 10 is moved relative to heating means 12 between each of the heating steps, required in each case to produce the novel results. The distance through which pipe 10 is moved relative to heating means 12 will hereinafter be referred to as the increment of movement of pipe 10 and designated as I. Since the bending of pipe length 10 involves deformation in both tension and compression it will be necessary to determine the critical length of the unit band with regards to buckling, localized elongation and localized upsetting.

The buckling wave length of pipe 10 at working temperature, usually 1400° F. with ferrous alloy pipe, may be calculated from any of the standard formulae, for instance:

$$\frac{\lambda}{2} = 1.72\sqrt{RT}\sqrt[4]{\frac{E_R}{E}}$$

wherein $\lambda$ is the buckling wave length; $R$ is the pipe radius; $T$ is the pipe thickness; $E$ is the modulus of elasticity at room temperature; and $E_R$ is the reduced modulus of elasticity at operating temperature.

We have found that the above formula, and other similar formulae, are not sufficiently accurate for our purposes at temperatures in the order of the working temperature of ferrous metal bodies, i. e., 1400° F. This is probably due to insufficient data on the behavior of the metal at such elevated temperature and the failure to account for such behavior in the formula. Since it is a simple matter to obtain the buckling wave length of pipe 10 at operating temperatures by observation, we prefer to thus obtain the buckling wave lengths. We then obtain the width of the unit band necessary to reduce distortion due to localized upsetting to a minimum; from the discussion heretofore such width should be equal to or less than the thickness of pipe 10. We also obtain the width of the unit band necessary to reduce distortion due to localized thinning out to a minimum; from the discussion heretofore such width should be equal to or greater than the thickness of pipe 10.

Knowing the percentage deformation necessary to effect the desired bend, we select the proper ratio of unit band width/pipe thickness (W/T) and since the pipe thickness is known we obtain the width of unit band which will give the desired results. Such width will generally be less than one-half the buckling wave length and somewhat greater than the thickness of the pipe so that while buckling is avoided some localized upsetting may be expected. We correct for this by choosing a proper increment of movement of the pipe. This is done by solving for I in the I/W ratio for the percentage elongation of the operation.

The values thus arrived at may be adjusted as experience dictates but in any event they will be kept within the limits hereinabove set forth.

We list in the table below factors employed in actual pipe bending operations:

predetermined time interval, that required by experience to bring the metal of the unit band to the required condition, the burner 12 is then shut off and the bending force applied through means 14 to bend the first unit band the required amount. The pipe 10 is then moved through chosen increment I relative to support 11 and the next unit band heated and bent. This procedure is repeated until the required bend is completed. The interval between the bending of one unit band and the heating of the next unit band may be adjusted as desired, however, by shortening this interval the operation can be converted from a step by step procedure into a substantially continuous one.

It is sometimes preferred to apply the bending force during the heating step either by maintaining a minimum load on the pipe at all times and increasing the load to maximum during bending, or by maintaining the maximum load on the pipe during the whole of the heating and bending cycle.

As many changes can be made in the above method and apparatus, and many apparently widely different embodiments of the invention can be made without departing from the scope of the claims, it is intended that all matter contained in the above description or shown in the accompanying drawings shall be interpreted as illustrative and not in a limiting sense, except as may be required by the claims.

We claim:

1. In the method of bending tubular thermo-

|   | Pipe O.D. | Wall Thickness | Unit Band Width W | Increment I | Radius of Bend | Deformation | W/T Ratio | I/W Ratio | Approximate Buckling Wave length (Observed) |
|---|---|---|---|---|---|---|---|---|---|
|   | Inches | Inches | Inches | Inches | Dia. | Percent |   |   | Inches |
| 1 | 6 | 0.074 | ¼ | ¼ | 8 | 6.25 | 3.38 | 1 | 2¾ |
| 2 | 6 | 0.074 | ¼ | ¼ | 6 | 8.33 | 3.38 | 1 | 2¾ |
| 3 | 6⅝ | 0.280 | ⅝ | ⅜ | 3 | 16.66 | 2.68 | .5 | 1½ |
| 4 | 6⅝ | 0.280 | ⅜ | ⅛ | 2 | 25.0 | 1.34 | .33 | 1½ |
| 5 | 6⅝ | 0.280 | ⅜ | ⅜ | 1.5 | 33.3 | 1.34 | .83 | 1½ |
| 6 | 24 | 0.375 | 1¼ | ¾ | 4 | 12.5 | 3.34 | .6 | 3½ |
| 7 | 24 | 0.375 | 1¼ | ⅜ | 3 | 16.66 | 3.34 | .4 | 3½ |

The pipe bends produced in accordance with the above data were all highly satisfactory. None of the bends showed any evidence of buckling nor did any of them show any objectionable localized upsetting and localized thinning out. In no case was there any defect due to the bending operation which would not pass commercial inspection.

In carrying out the actual pipe bending operation, pipe 10 is positioned in support 11 and so located relative to burner 12 that the first band heated will be located at one end of the desired bend. The portion of pipe 10 at said first band and the metal adjacent thereto is then brought to what may be called the prebending temperature, i. e., the temperature that the pipe metal adjacent a heated and worked band attains when the operation has progressed to equilibrium. This is done in order to obtain uniform results throughout the length of the bend and to make it possible to control the heating step through the amount of time the burner 12 is kept in operation.

The initial portion of the bend is brought to the preheating temperature by subjecting it to the full heat of burner 12 for a short period and then allowing it to cool and then repeating this cycle several times until the required prebending temperature is attained. After this the first unit band is subjected to the heat of burner 12 for a plastic bodies having thin walls by hot-working, the steps comprising, subjecting a predetermined area of the body to be bent to large quantities of heat at high temperature levels to rapidly bring a circumferential unit band thereof, having a width not greater than one-half the natural buckling wavelength of said body, to such a degree of plasticity that uniform plastic flow of the material of said unit band takes place without substantial undesired distortion upon application of bending pressure, the formation of said heated unit band taking place at such a rapid rate that the material of said body contiguous thereto remains in condition to resist deformation when the bending pressure is applied, and applying pressure to said body to bend said heated unit band by substantially uniform plastic flow of the material thereof without substantial undesired distortion, said contiguous material serving to control the shaping of the material of said heated unit band and to maintain its contour.

2. In the method of bending tubular thermoplastic bodies having thin walls by hot-working, the steps comprising, heating a circumferential unit band of the body to be bent to a desired degree of plasticity while maintaining material of said body contiguous to said heated unit band in condition to resist deformation when bending force is applied, controlling the heating of said unit band to limit the width thereof to a dimension not greater than one-half the natural buckling wavelength of said body so that uniform plastic flow of the heated material takes place without substantial undesired distortion upon application of said bending force and to establish heat gradients along lines passing through said heated unit band in the direction of the length of said body having substantially zero slope for the full extent of said heated unit band and sharp slopes for the extent of the heated portions of said contiguous material, and applying force to bend said heated unit band while controlling the shaping and maintenance of the contour thereof through said deformation resisting contiguous material.

3. In the method of bending tubular thermoplastic bodies having thin walls by subjecting heated portions thereof having a predetermined area to bending force, the steps comprising, heating a circumferential unit band of the body to be bent to the degree required for plastic flow of the material of said unit band upon application of the bending force, controlling the heating of said unit band to limit its maximum dimension in the direction in which buckling tends to occur to a value approximately one-half the natural buckling wavelength, or less, of the body in said direction to prevent buckling and secure uniform flow of the material of said unit band when said band is bent, maintaining the material contiguous to said band in condition to resist deformation, and applying force to bend said heated unit band.

4. In the method of bending tubular thermoplastic bodies having thin walls by subjecting heated portions thereof having a predetermined area to bending force, the steps comprising, heating a circumferential unit band of the body to the degree required for plastic flow of the material of said unit band upon application of the bending force, controlling the heating of said unit band to limit its axial width in which localized thinning out tends to occur in the convex side of the band to a value in the order of but greater than the thickness of the body wall to prevent localized thinning out when said band is bent, said width not to exceed one-half the natural buckling wavelength of said body wall, and applying force to said body to bend said heated band.

5. In the method of bending tubular thermoplastic bodies having thin walls by subjecting heated portions thereof having a predetermined area to bending force, the steps comprising, heating a circumferential unit band of the body to the degree required for plastic flow of the material of said unit band upon application of the bending force, controlling the heating of said unit band to limit its axial width in which localized thinning out tends to occur in the convex side of the band to a value in the order of but greater than the thickness of the body wall to prevent localized thinning out when said band is bent, said width not to exceed one-half the natural buckling wavelength of said body wall, applying force to said body to bend said heated band, and repeating said unit band heating and bending steps until said body is bent as required, contiguous unit bands being overlapped to substantially eliminate the effects of localized thinning out on the convex side.

6. In the method of bending tubular thermoplastic bodies having thin walls by subjecting heated portions thereof having a predetermined area to bending force, the steps comprising, heating a circumferential unit band of the body to the degree required for uniform plastic flow of the material of said unit band, controlling the heating of said unit band to limit its maximum dimension in the direction in which undesired distortion tends to occur to the value, not greater than four times the thickness of the body wall, and not greater than one-half the natural buckling wavelength of said body wall, required to limit undesired distortion to a minimum, and applying force to the body to bend said unit band.

7. The method of bending tubular thermoplastic bodies as defined in claim 6, in which said maximum dimension of the band is not less than the thickness of the wall of the body.

8. In the method of bending tubular thermoplastic bodies having thin walls by subjecting heated portions thereof having a predetermined area to bending force, the steps comprising, heating a circumferential unit band of the body to the degree required for uniform plastic flow of the material of said unit band, controlling the heating of said unit band to limit its maximum dimension in the direction in which undesired distortion tends to occur to a value, not greater than four times the thickness of the body wall, and not greater than one-half the natural buckling wavelength of said body wall, but not less than the thickness of the body wall, required to limit undesired distortion to a minimum, applying force to the body to bend said unit band, and repeating said unit band heating and bending steps until the body is bent as required, contiguous unit bands being overlapped an amount, ranging from a nominal amount to an amount approaching said maximum dimension, sufficient to reduce the effects of undesired distortion to an acceptable minimum.

9. In the method of bending tubular thermoplastic bodies having thin walls by subjecting heated portions thereof to bending forces, the steps comprising, heating a circumferential unit band of the body to the degree required for uniform plastic flow of the material of said unit band upon application of the bending force, controlling the heating of said unit band to limit its dimension in the direction in which buckling tends to take place to a value not greater than four times the thickness of the wall of the body, and not greater than one-half the natural buckling wavelength of said wall, but not less than the thickness of said wall to prevent buckling and to reduce localized upsetting when said band is bent, maintaining the material contiguous to said band in condition to resist deformation by said bending force, applying sufficient force to said body to bend said heated band, repeating said unit band heating and bending steps until said body is bent as required, and overlapping contiguous unit bands to substantially eliminate the effects of localized upsetting.

10. In the method of bending tubular thermoplastic bodies having thin walls by subjecting heated portions thereof having a predetermined area to bending force, the steps comprising, heating a circumferential unit band of the body to the degree required for uniform plastic flow of the material of said unit band, controlling the heating of said unit band to limit its maximum dimension in the direction in whch undesired distortion tends to occur to a value sufficient to limit undesired distortion to a minimum under the operating conditions, selectively employing said value in the order of four times the thickness of the body wall when the unit band is to be deformed in the order of 10%, in the order of three times the thickness of the body wall when the unit band is to be deformed in the order of 20%, in the order of twice the thickness of the body wall when the unit band is to be deformed in the order of 25% and in the order of the thickness of the body wall when the unit band is to be deformed in the order of 30%, said value in no case being greater than one-half the natural buckling wavelength of said body wall, and applying force to the body to bend said unit band.

11. In the method of bending tubular thermoplastic bodies having thin walls by subjecting heated portions thereof having a predetermined area to bending force, the steps comprising, heating a circumferential unit band of the body to the degree required for uniform plastic flow of the material of said unit band, controlling the heating of said unit band to limit its maximum dimension in the direction in which undesired distortion tends to occur to a value, not greater than four times the thickness of the body wall, and not greater than one-half the natural buckling wavelength of said body wall, but not less than the thickness of the body wall, required to limit undesired distortion to a minimum, applying force to the body to bend said unit band, repeating said unit band heating and bending steps until the body is bent as required, contiguous unit bands being overlapped an amount sufficient to reduce the effects of undesired distortion to a minimum, and selectively employing an amount of overlap which is a nominal amount when the unit bands are deformed in the order of 10% and less, an amount in the order of 25% of said maximum dimension when the unit bands are deformed in the order of 12.5%, an amount in the order of 50% of said maximum dimension when the unit bands are deformed in the order of 16.6%, an amount in the order of 75% of said maximum dimension when the unit bands are deformed in the order of 25% or more.

12. In the method of bending tubular thermoplastic bodies having thin walls by subjecting heated portions thereof having a predetermined area to bending force, the steps comprising, heating a circumferential unit band to the degree required for uniform plastic flow of the material of said unit band, controlling the heating of said unit band to limit its maximum dimension in the direction in which undesired distortion tends to occur to a value sufficent to limit undesired distortion to a minimum under the operating conditions, selectively employing said value in the order of four times the thickness of the body wall when the unit band is to be deformed in the order of 10%, in the order of three times the thickness of the body wall when the unit band is to be deformed in the order of 20%, in the order of twice the thickness of the body wall when the unit band is to be deformed in the order of 25% and in the order of the thickness of the body wall when the unit band is to be deformed in the order of 30%, said value in no case being greater than one-half the natural buckling wavelength of said body wall, applying force to the body to bend said unit band, repeating said unit band heating and bending steps until the body is bent as required, contiguous unit bands being overlapped an amount sufficient to reduce the effects of undesired distortion to a minimum, and selectively employing an amount of overlap which is a nominal amount when the unit bands are deformed in the order of 10% and less, an amount in the order of 25% of said maximum dimension when the unit bands are deformed in the order of 12.5%, an amount in the order of 50% of said maximum dimension when the unit bands are deformed in the order of 16.6%, an amount in the order of 75% of said maximum dimension when the unit bands are deformed in the order of 25% or more.

13. In the method of bending thermoplastic bodies having thin walls by hot-working, the steps comprising, subjecting a predetermined area of the body to be bent to large quantities of heat at high temperature levels to rapidly bring a peripheral unit band thereof, having a width not greater than one-half the natural buckling wavelength of said body, to such a degree of plasticity that uniform plastic flow of the material of said unit band takes place without substantial undesired distortion upon application of bending pressure, the formation of said heated unit band taking place at such a rapid rate that the material of said body contiguous thereto remains in condition to resist deformation when the bending pressure is applied, and applying pressure to said body to bend said heated unit band by substantially uniform plastic flow of the material thereof without substantial undesired distortion, said contiguous material serving to control the shaping of the material of said heated unit band and to maintain its contour.

14. In the method of bending thermoplastic bodies having thin walls by hot-working, the steps comprising, heating a peripheral unit band of the body to be bent to a desired degree of plasticity while maintaining material of said body contiguous to said heated unit band in condition to resist deformation when bending force is applied, controlling the heating of said unit band to limit the width thereof to a dimension not greater than one-half of the natural buckling wavelength of said body so that uniform plastic flow of the heated material takes place without substantial undesired distortion upon application of said bending force and to establish heat gradients along lines passing through said heated unit band in the direction of the length of said body having substantially zero slope for the full extent of said heated unit band and sharp slopes for the extent of the heated portions of said contiguous material, and applying force to bend said heated unit band while controlling the shaping and maintenance of the contour thereof through said deformation resisting contiguous material.

15. In the method of bending thermoplastic bodies having thin walls by subjecting heated portions thereof having a predetermined area to bending force, the steps comprising, heating a peripheral unit band of the body to the degree required for plastic flow of the material of said unit band upon application of the bending force, controlling the heating of said unit band to limit its axial width in which localized thinning out tends to occur in the convex side of the band to a valve in the order of but greater than the thickness of the body wall to prevent localized thinning out when said band is bent, said width not to exceed one-half the natural buckling wavelength of said body wall, and applying force to said body to bend said heated band.

DAVID B. ROSSHEIM.
FREDERICK A. FICHTMUELLER.
JAN MARTIN SCHENK.

(References on following page)

REFERENCES CITED

The following references are of record in the file of this patent:

UNITED STATES PATENTS

| Number | Name | Date |
|---|---|---|
| 783,716 | Brinkman | Feb. 28, 1905 |
| 784,101 | Brinkman | Mar. 7, 1905 |
| 785,083 | Brinkman | Mar. 21, 1905 |
| 2,208,121 | Davis | July 16, 1940 |
| 2,410,052 | Dewey | Oct. 29, 1946 |
| 2,433,055 | Linden | Dec. 23, 1947 |

OTHER REFERENCES

"The Oxy-Acetylene Handbook," pub. by the Linde Air Products, 1943 (TS 227-L638—copy 2).

The Welding Journal, Nov. 1942 issue, pp. 776-781, 20-page typed booklet, copyright 1938 by Joseph Holt, pp. 1-19, Library of Congress Class AA 83427 (TS-277 H 758).

Certificate of Correction

Patent No. 2,480,774 August 30, 1949

DAVID B. ROSSHEIM ET AL.

It is hereby certified that error appears in the printed specification of the above numbered patent requiring correction as follows:

Column 14, line 63, for the word "valve" read *value*;

and that the said Letters Patent should be read with this correction therein that the same may conform to the record of the case in the Patent Office.

Signed and sealed this 31st day of January, A. D. 1950.

[SEAL]

THOMAS F. MURPHY,
*Assistant Commissioner of Patents.*